(12) United States Patent
Endo

(10) Patent No.: US 6,886,991 B2
(45) Date of Patent: May 3, 2005

(54) OPTICAL FIBER FIXING METHOD

(75) Inventor: Takashi Endo, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 19 days.

(21) Appl. No.: 10/611,101

(22) Filed: Jul. 2, 2003

(65) Prior Publication Data

US 2004/0028345 A1 Feb. 12, 2004

(30) Foreign Application Priority Data

Jul. 18, 2002 (JP) ........................................ 2002-209513

(51) Int. Cl.⁷ .............................................. G02B 6/36
(52) U.S. Cl. .......................................................... 385/78
(58) Field of Search ............................... 385/76, 77, 78

(56) References Cited

U.S. PATENT DOCUMENTS

2003/0095752 A1  5/2003 Clarkin et al. ................ 385/72

FOREIGN PATENT DOCUMENTS

| DE | 199 59 862 | 6/2001 |
| DE | 100 04 0538 | 8/2001 |
| EP | 0 678 486 | 10/1995 |
| JP | 11-142688 | 5/1999 |
| WO | 01/88583 | 11/2001 |

OTHER PUBLICATIONS

Copy of European Patent Office Communication including European Search Report for corresponding European Patent Application No. GB 0315625.4 dated Dec. 17, 2003.
Hänsch, D.; Ebert, T.: "Kunststoffschweißen—Entscheidend sind die Nähte", Laserpraxis, Jun. 1999, pp. 16–18.
Copy of German Patent Office Action including translation for corresponding German Patent Application No. 103 31 553.5–51 dated Mar. 4, 2004.

*Primary Examiner*—Khiem Nguyen
(74) *Attorney, Agent, or Firm*—Armstrong, Kratz, Quintos, Hanson & Brooks, LLP

(57) ABSTRACT

While a ferrule or a laser beam is being shifted in an axial direction, the laser beam is applied, thereby forming a plurality of welded portions at the boundary between a coating of an optical fiber and the ferrule. A YAG laser in a Q switch pulse mode is used to provide a laser beam. The YAG laser in the Q switch pulse mode is preferably oscillated in a pulse exciting system. The ferrule is made of transparent or semi-transparent synthetic resin. The coating of the optical fiber is made of translucent synthetic resin. In this way, an optical fiber fixing method can be provided which can surely fix an optical fiber and a ferrule in a shortened time, and minimize the thermal influence on the vicinity of the portion to be processed.

8 Claims, 3 Drawing Sheets

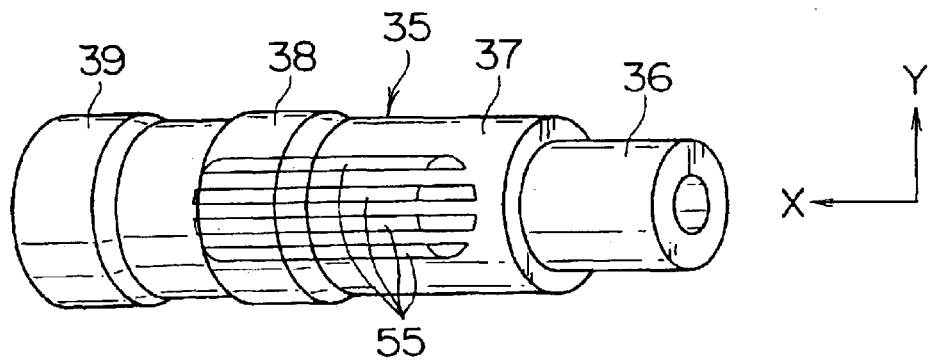
F I G. 3A
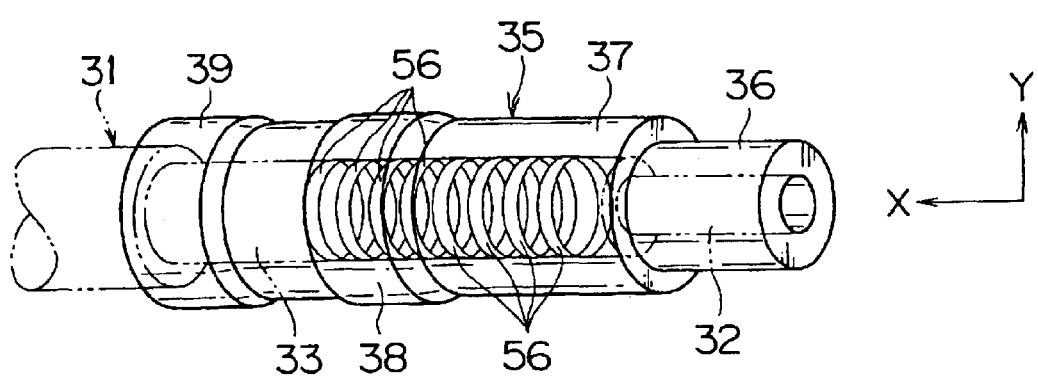
F I G. 3B
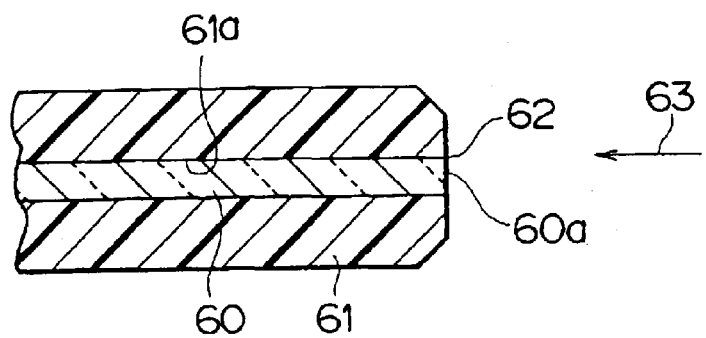
F I G. 5

OPTICAL FIBER FIXING METHOD

BACKGROUND OF THE INVENTION

1. Field of the Invention

The present invention relates to an optical fiber fixing method for fixing a ferrule, which is a terminal component for optical communication, and an optical fiber to each other.

2. Description of the Related Art

As well known, a method of connecting optical fibers to each other is roughly classified into a permanent connection in which they cannot be disconnected after once connected, and a connector splicing in which they can be freely disconnected even after being once connected. The permanent connection is utilizes a technique of fusion splicing or bonding splicing. The connector splicing fits connectors (one is a plug, and the other is a receptacle) to each other so that the end surfaces of optical fibers are physically spliced to each other.

The latter connector connection has a disadvantage of great connection loss of the optical fiber resulting from axis displacement, axis inclination, etc., but has an advantage of a short splicing time. Therefore, the connector splicing has been widely employed as a connecting technique for short-distance optical communication, e.g., a technique of communication devices within a vehicle such as a motor car.

The optical connector for connector splicing includes an optical fiber serving as a communication line and a ferrule serving as a terminal component. The ferrule is employed to position the optical fiber in an axial direction and a radial direction, and to fix the terminal side of the optical fiber. The technique for splicing the optical fiber and ferrule is implemented in various manners, in particular, in a manner of using adhesive.

An explanation will be given of the method of splicing the optical fiber and ferrule using adhesive. The optical fiber includes a fiber wire composed of a core and cladding, and a coating. On the tip side of the optical fiber, the coating is peeled to expose the fiber wire.

The ferrule is formed in a cylindrical shape. The through-hole formed internally has a small diameter portion and a large diameter portion. The small diameter portion has a diameter large enough to insert the fiber wire. The large diameter portion has a diameter large enough to insert the coating. The tip of the fiber wire passed into the small diameter portion is ground to be flush with the end surface of the ferrule.

The ferrule and optical fiber can be made of various materials, e.g., quartz glass or synthetic resin. Further, the ferrule may be made of metal or ceramic.

The optical fiber and ferrule are fixed to each other in such a manner that adhesive is applied to the coating of the optical fiber, the optical fiber is inserted into the ferrule and the adhesive is hardened.

However, the fixing method using the adhesive takes a long time to heat and harden the adhesive. This presents problems of low productivity of the optical connector, of changes in the bonding strength due to the surface property (surface wettability, surface coarseness, etc.) and of low heat resistance. JP-A-1'-142688 has proposed a technique for solving these problems.

As seen from FIG. 5, by irradiating the end surface 60a of an optical fiber 60, inserted in a through-hole 61a of a ferrule 61, with a laser beam 63, the boundary 62 between the ferrule 61 and optical fiber 60 is molten with thermal energy of the laser beam 63 so that the ferrule 61 and the optical fiber 60 are fixed to each other.

However, the conventional fixing method presents the following problem to be solved.

Firstly, because the ferrule 63 is irradiated with the laser beam 61 from its end surface, the molten area is so small that fixing cannot be assured. Therefore, if tensile stress acts on the optical fiber 60, the optical fiber 60 may detach from the ferrule 61.

Secondly, even when the laser beam 63 is applied from the side of the ferrule, according to the manner of applying the laser beam 63, the laser beam 63 is not uniformly applied so that the fixing force is not constant. Specifically, in some places, the laser beam 63 is strongly applied and the fiber wire may be damaged, whereas in other places, the laser beam 63 is weakly applied and the fiber wire may be insufficiently heated. The reason why the laser beam 63 is applied strongly or weakly is that the applying distance of the laser beam 63 varies according to places.

If the applied area becomes large because the laser beam is out of focus, the layer susceptive to thermal influence extends outwardly. In this case, the fiber wire consisting of a core and cladding may generate thermal cracks. The layer susceptive to thermal influence can be narrowed by decreasing the output of the laser beam. However, in this case, the heating becomes insufficient so fixing cannot be assured.

SUMMARY OF THE INVENTION

In view of the above problems, an object of the present invention is to provide an optical fiber fixing method which can reduce the time taken to fix an optical fiber and a ferrule, assure the fixing and minimize the thermal influence on the vicinity of the place to be processed.

In order to attain the above object, there is provided an optical fiber fixing method for fixing an optical fiber having a coating into a cylindrical ferrule, comprising the step of:

applying a laser beam while either the ferrule or laser beam is being shifted in an axial direction of the ferrule so that a plurality of welded portions are formed at the boundary between the coating of the optical fiber and the ferrule.

In accordance with the configuration, because the optical fiber and ferrule are fixed to each other using a laser beam, the time needed for fixing can be shortened. Further, because the laser beam is applied while either the ferrule or the laser beam is being shifted in an axial direction of the ferrule, the welded portions each having a line shape are formed with the laser beam being in focus, i.e., the power density of the laser beam being constant so that the welding area can be increased and the fixing force between the optical fiber and the ferrule can also improved. Furthermore, by narrowing the interval between the adjacent welded portions, the welding area can be further increased, thereby improving the fixing force. Therefore, even if the surface of the material to be processed is curved, the laser welding can be performed with the power density being constant.

In order to the above object, there is also provided an optical fiber fixing method for fixing an optical fiber having a coating into a cylindrical ferrule, comprising the step of:

applying a laser beam while either the ferrule or laser beam is being shifted in a direction perpendicular to an axial direction of the ferrule so that a plurality of welded portions are formed at the boundary between the coating of the optical fiber and the ferrule.

In accordance with this configuration, the welded portions each having a line shape can be easily formed without rotating the ferrule, thereby improving the workability of fixing between the optical fiber and the ferrule.

In order to attain the above object, there is also provided an optical fiber fixing method for fixing an optical fiber having a coating into a cylindrical ferrule, comprising the step of:

applying a laser beam while either the ferrule or laser beam is being rotated about a longitudinal axis of the ferrule, so that a plurality of welded portions are formed at the boundary between the coating of the optical fiber and the ferrule.

In accordance with the above configuration, because the laser beam is applied while either the ferrule or the laser beam is being rotated, the welded portions each having an arc shape can be formed with the laser beam being in focus, i.e., the power density being constant.

In the optical fiber fixing method, preferably, the laser beam is provided by a YAG laser in a Q switch pulse mode.

In accordance with the above configuration, because the laser beam is provided from the YAG laser in the Q switch pulse mode, high output can be obtained for a short time. This prevents thermal influence such as thermal shock from being given to the fiber wire consisting of a core and cladding.

In the above optical fiber fixing method, preferably, the YAG laser is oscillated in a pulse-exciting system.

In accordance with the above configuration, because the laser beam is excited in the pulse exciting system, the laser welding can be performed with a shallow welding depth and less influence on the environment.

In any one of the above optical fiber fixing methods, preferably, the ferrule is made of transparent or semitransparent synthetic resin, and the coating of the optical fiber is made of opaque synthetic resin.

In accordance with the above configuration, because the ferrule is made of the transparent or semi-transparent synthetic resin, the laser beam passes through the ferrule. Because the coating is made of the opaque synthetic resin, the laser beam is absorbed into the coating. Thus, the laser beam applied from the outside of the ferrule is not absorbed by the ferrule but absorbed by the coating which is to be heated and molten.

The above and other objects and features will be more apparent from the following description taken in conjunction with the accompanying drawings.

BRIEF DESCRIPTION OF THE DRAWINGS

FIGS. 3A and 3B are views showing the laser-welded states of the optical fiber and a ferrule in which a striped welded portion is formed in an axial direction of the ferrule (FIG. 3A) and in which arc shaped welded portions are formed in a direction perpendicular to the axial direction of the ferrule (FIG. 3A), respectively;

FIG. 5 is a sectional view showing an example of a conventional optical fiber fixing method.

DESCRIPTION OF THE PREFERRED EMBODIMENT

Figure 1:
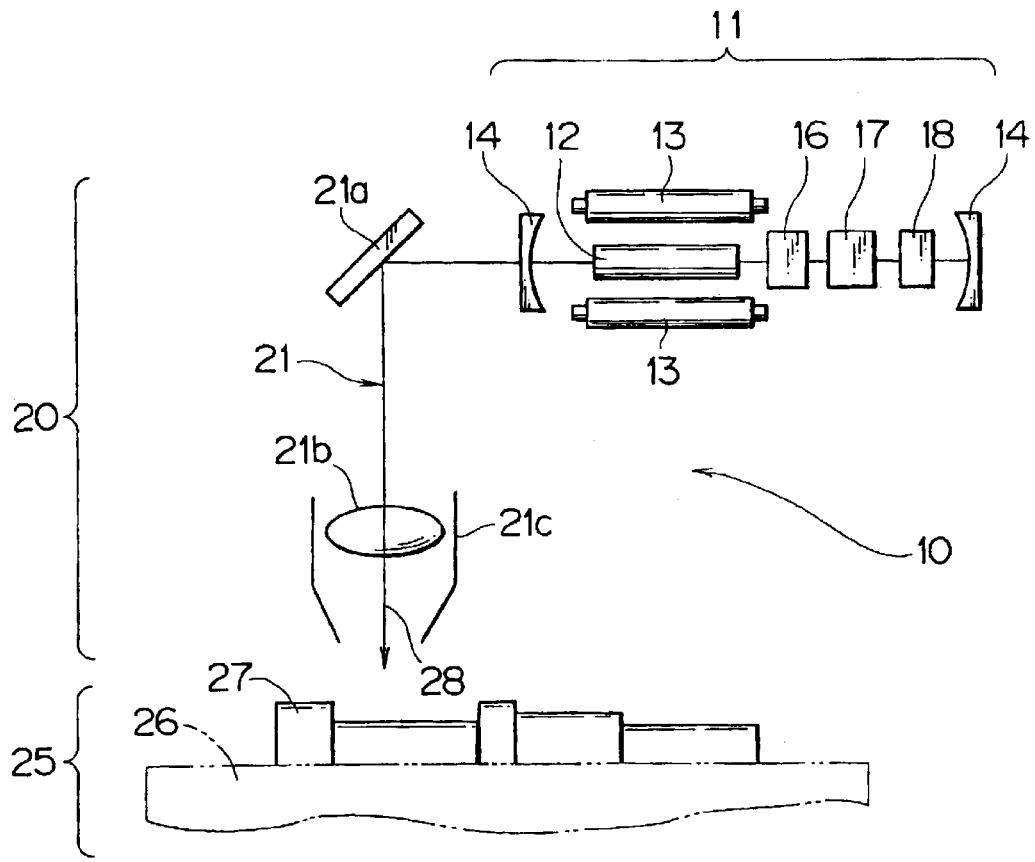
FIG. 1 is a diagram showing the basic configuration of a YAG laser processing machine employed in an embodiment of the method for fixing an optical fiber according to the present invention.

Now referring to the drawings, a detailed explanation will be given of an embodiment of the present invention.

FIGS. 1 to 4 show an embodiment of an optical fiber fixing method according to the present invention.

FIG. 1 shows a basic configuration of a YAG laser processing machine 10 which is employed in this embodiment. The YAG laser processing machine 10 includes a laser oscillator 11, a processing optical system 20 and a workpiece system 25 to be processed.

The basic configuration of the laser oscillator 11 includes at least one host member (rod) 12, an exciting lamp 13 and a pair of beam condensing reflecting mirrors 14. The host member 12 is cylindrical and made of a YAG (yttrium aluminum garnet) crystal doped with Nd (neodymium). The laser output is integer-times as large as the host member 12.

The exciting lamp 13 is a pumping device for injecting energy into the host member 12 and induced-emitting light. A pair of exciting lamps are arranged on both sides of the host member 12. The pumping format of the YAG laser includes a continuous-wave (CW) pumping format and a pulse exciting format. The CW pumping employs a Kr arc lamp. The pulse pumping employs a Xe flash lamp. Both pumping lamps pump (side-pump) the host member 12 from the side.

In the CW pumping, the pumping is continuously carried out to provide the laser beam 28 due to the CW oscillation. In the pulse pumping, the pumping is intermittently carried out to provide the laser beam 28 due to the pulse oscillation. In short, the YAG laser can be employed for both CW oscillation based on the CW pumping and the pulse oscillation based on the pulse pumping.

The beam condensing reflecting mirror 14 is provided around the host member 12 and pumping lamp 13. The beam condensing reflecting mirror 14 serves to inject effectively the laser beam from the pumping lamp 13 into the host member 12, and amplify the bumped laser beam.

On an extending line of the host member 12, between the pair of beam condensing reflecting mirrors 14 and 14 are arranged a mode selector 16, Q switch 17 and a beam shutter 18. The mode selector 16 serves to select the strength distribution (transverse mode) of the laser beam 28. A stable mode of the strength distribution is a Gaussian mode ($TEM_{00}$) in which the beam strength becomes low at a farther position from the optical axis. An unstable mode of the strength distribution is a multimode. The multimode provides a high output in the Gaussian mode. The laser beam 28 in the Gaussian has an advantage of suitableness of processing at high precision.

The multimode and Gaussian mode each have a continuous-wave (CW) pumping and a pulse pumping. In the multimode, the CW pumping in the multimode provides a high output of several tens of W to 2 KW. The pulse pumping provides an output of several KWs or higher. On the other hand, in the Gaussian mode, the CW pumping provides an output of 6 to 10 W. The pulse pumping provides an output of several Ws.

The beam shutter 18 is a safety device for emergency cut-out of laser oscillation. Therefore, normally, the beam shutter 18 is not normally turned on/off to operate the YAG laser processing machine 10.

As described above, the oscillation mode of the laser beam 28 has a Q switch pulse as well as the multimode and Gaussian mode (single mode). The Q switch pulse is a technique for acquiring a peak output with a high output and a narrow time width by performing pumping in a state with the loss of the laser oscillator 11 increased to accumulate energy at an exciting level and reducing the loss at a convenient time. This invention is characterized in that the Q switch pulse is employed for the laser beam 28.

The Q switch pulse laser is a laser which is operated so that a short pulse can be repeatedly oscillated at a high speed. Unlike the pulse pumping system, the Q switch pulse does not oscillate the laser repeatedly by turning on/off. The Q switch, therefore, can oscillate the laser at a high repetition speed on the order of kHz.

An explanation will be provided of the theory of the Q switch operation. The Q switch operation is carried out by the Q switch 17 (optical shutter) which is incorporated in the laser oscillator 11. When the Q switch 17 turns on/off (switches) the pumping lamp 13 for CW pumping and pulse pumping at a high speed, the laser beam 28 with a short pulse and high peak output is oscillated.

The Q switch 17 includes an AO (acoustic optics) Q switch and an EO (electric optics) Q switch. The AO-Q switch is a switch for CW pumping. In this system, with a laser element provided within the laser oscillator 11, an ultrasonic wave is turned on/off to provide the laser beam 28 to several tens of kHz.

The repetitive frequency of the Q switch 17 can be set at 0.1–30 kHz. However, according to the output characteristic of the Q switch 17, because the peak output is lowered when the repetitive frequency is too low or too high, in this embodiment, the repetitive frequency is set at 2–10 Hz.

The EO-Q system serves as a shutter together with a deflecting element by deflecting a deflecting direction by external application of an electric field. The EO-Q switch is employed for a Q switch pulse at a high speed.

The basic configuration of the processing optical system 20 includes a beam bender 21 and a beam positioner (not shown). Where the laser oscillator 11 and a workpiece 27 are held horizontally, the beam bender 21 serves to cause the laser beam 28 to be vertically incident on the workpiece 27. The beam bender 21 is provided with a mirror 21a and a condensing lens 21b. The mirror 21a serves to change the optical path of the laser beam 28 oscillated by the laser oscillator 11. The condensing lens 21b incorporated within a nozzle 21a serves to condense the laser beam 28.

The beam bender 21 is provided with a fine adjusting mechanism (not shown) which can alter the positions of the workpiece 27 and condensing lens 21b. For this reason, the laser beam 28 is uniformly applied to the ferrule having a three-dimensional curve.

The basis configuration of the workpiece system 25 includes a worktable 26 and a driving mechanism (not shown) for driving the worktable 26 in two-axes directions. The driving mechanism serves to determine the positional relationship between the processing optical system 20 and the workpiece 25. The driving mechanism shifts the worktable 26 in any direction by the driving mechanism so that the laser beam 28 apparently scan on the workpiece 27. Incidentally, with the worktable 26 secured, the processing optical system 20 may be shifted in the two-axes directions by an NC controller.

Figure 2:
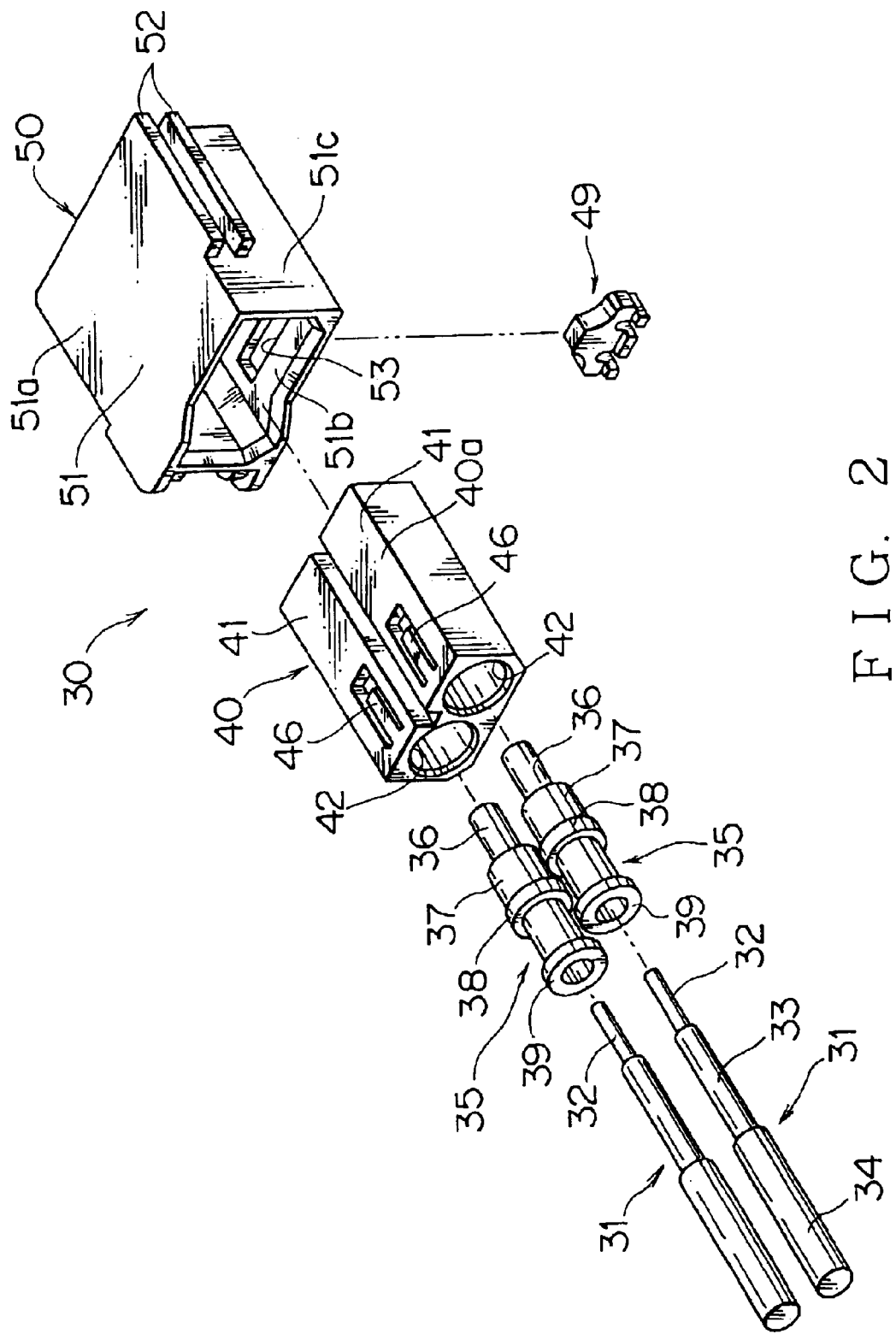
FIG. 2 is an exploded perspective view of an optical connector including the optical fiber.

FIG. 2 is an exploded perspective view of an optical connector 30. The optical connector 30 includes an optical fiber 31, a ferrule 35, an optical adapter 40 and an optical adapter cover 50. The respective components will be explained in this order.

The optical fiber 31 includes a fiber wire 32, an inner sheath (also referred to as a coating) 33 for covering the fiber wire 32, and an outer sheath for sheathing the outside of the inner sheath. The fiber wire 32 is a plastic fiber wire made of synthetic resin. For example, PMMA (poly methyl methacrylate) or polycarbonate (PC) having heat resistance is employed as the material of a core and fluororesin and the like are employed as the material for a cladding.

The core located centrally in the fiber wire 32 is a waveguide (transmission line) for transmitting an optical signal. The cladding is located outside the core and serves to confine light within the core. The cladding is made of a material having a small refractive index. Therefore, the optical signal is reflected on the boundary between the core and cladding so that it is confined within the core.

The inner sheath 33 and the outer sheath 34 are made of synthetic resin having insulation and fire resistance, such as polyethylene, vinyl chloride, nylon, etc.

The inner sheath 33 and outer sheath 34 are peeled successively from the tip of the optical fiber 31 so that the fiber wire 32 is exposed to a prescribed length. The inner sheath 33 is exposed on the tip side of the outer sheath 34 to a prescribed length. The inner sheath 33 is heated by the laser beam 28 and is fixed.

The ferrule 35 is a plastic ferrule which is made of a transparent or semi-transparent synthetic resin capable of transmitting the laser beam. The ferrule 35 is a stepped cylinder which includes a small-diameter portion 36 which accommodates the fiber wire 32 in a through-hole 35a (FIG. 4) and a large-diameter portion 37 which is continuous to the small-diameter portion 36 which accommodates the inner sheath 33 in the through-hole 35a. The fiber wire 32 is inserted in the through-hole 35a so that it is exposed from the end of the small-diameter portion 36. The fiber wire 32 is ground together with the ferrule 35 so that the end face is exposed.

The body of the large-diameter portion 37 has a first flange 38 and a second flange 39 which are ring-shaped, respectively. The first flange 38 is formed in the middle of the large-diameter portion 37, and the second flange 39 is formed at the end of the large-diameter portion 37.

Figure 4:
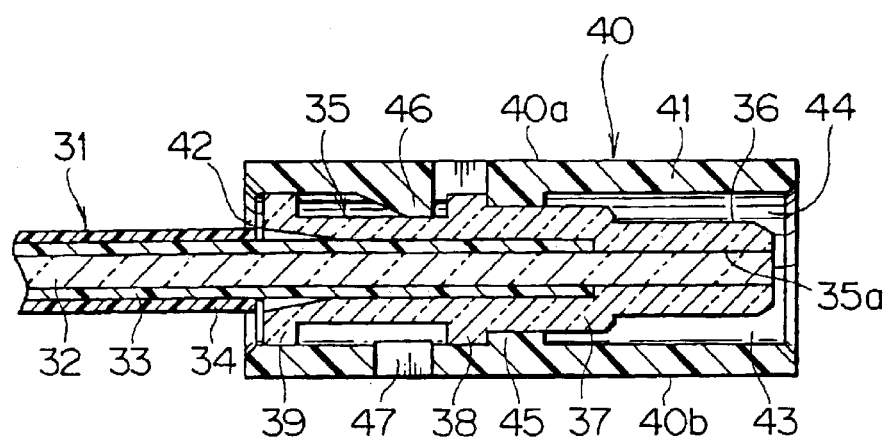
FIG. 4 is a sectional view of the state where the terminal side of the optical fiber is inserted into the ferrule fit into an optical adapter.

The optical adaptor 40 is made of synthetic resin, and includes two cylinders 41, 41 each having an external square shape, which are integrally arranged side-by-side. These two cylinders 41, 41 are symmetrical. Each cylinder 41 includes an insertion inlet 42, an accommodating chamber 43 (FIG. 4) and a connection inlet 44 (FIG. 4).

The insertion inlet 42 is a circular through-hole formed for inserting the terminal side of the optical fiber 31. The insertion inlet 42 is formed in the end face of the one side in a longitudinal direction of the optical adaptor 40. The diameter of the insertion inlet 42 is made slightly larger than those of the first and second flange 38 and 39.

The accommodating chamber 43 is made longer than the ferrule 35 so that the accommodated ferrule 35 does not protrude from the connection inlet 44. This intends to prevent the respective tips of the ferrule 35 and the optical fiber 31 from being damaged or broken. The accommodating chamber 43 has diameters equal to those of the insertion inlet 42 and connection inlet 44, and has a ring-shaped stopper 45 (FIG. 4) which protrudes inwardly and formed circumferentially in the middle. The stopper 45 is in contact with the first flange 38 of the ferrule 35 so that the ferrule 35 is positioned in the longitudinal direction.

The connection inlet 44 is formed on the other end face of the optical adapter 40 in the longitudinal direction. The connection inlet 44 is a place into which a complementary optical connector (not shown) is fit, and is formed in a shape of a circular through-hole.

The optical adapter 40 has a securing portion 46 formed at an upper wall 40a and an engagement hole 47 formed at a lower wall 40b (not shown). The securing portion 46 is a flexible securing piece formed on the side of the insertion inlet 42 with respect to the center of the optical adapter 40.

The securing portion 46 is engaged with the first flange 38 of the ferrule to prevent the ferrule 35 from coming off from the rear.

The engagement hole 47 is communicated with the accommodating chamber 43. A holder 49, which is inserted in the engagement hole 47, is engaged with the first flange 38 of the ferrule 35 to secure the ferrule 35 doubly.

The optical adaptor cover 50, which is made of synthetic resin, is formed in the form of a frame so as to receive the optical adaptor 40. The optical adaptor cover 50 is composed of a deep wall and a circumferential wall 51. The circumferential wall 51 is composed of an upper wall 51a, a low wall 51b and side walls 51c, 51c (only one is shown).

In the lower wall 51b of the optical adaptor cover 50, an engagement hole 53 is formed so as to correspond to the holder 49. The engagement hole 53 has a size approximately equal to the engagement hole 47 (FIG. 4) of the optical adaptor 40. When the holder 49 is inserted into the engagement hole 53, the holder 49 passes through the engagement hole 53 and is engaged with the first flange 38 of the ferrule 35.

FIG. 4 shows the state where the terminal side of the optical fiber 31 is inserted in the ferrule 35 fit in the optical adaptor 40. The optical fiber 31 is inserted from the rear end of the ferrule 35 and the outer sheath 34 is engaged with the end of the second flange 39. Thus, the optical fiber 31 is positioned in the longitudinal direction.

The fiber wire thus inserted is brought into intimate contact with the inner wall of the ferrule 35 so that its optical axis is accurately positioned radially so as to be free from no inclination.

The ferrule 35 is longitudinally positioned in contact with the stopper 45 of the optical adaptor 40. The first flange 38 of the ferrule 35 is secured by the securing portion 46 so that the ferrule 35 does not come off from the direction opposite to that of insertion.

FIGS. 3A and 3B show the state where the optical fiber 31 and ferrule 35 have been laser-welded by the YAG laser processing machine 10, respectively. Specifically, FIG. 3A shows the case where welded portions 55 composed of lines has been welded in an axial direction X of the ferrule 35. FIG. 3B shows the case where welded portions composed of arcs in a direction Y perpendicular to the axial direction. In both cases, the welded portions 55, 56 are formed at the boundary between the inner sheath 33 and ferrule 35 so that the fiber wire 32 is not thermally influenced.

The welded portion 55 shown in FIG. 3A can be formed, for example, by shifting the fixed laser beam 28 in the axial direction X of the ferrule 35. The plurality of welded portions 55 can be formed by shifting the ferrule 35 with a prescribed pitch in the direction Y perpendicular to the axial direction. Otherwise, with the ferrule 35 being fixed, the laser beam 28 may be shifted.

The welded portion 56 shown in FIG. 3B can be formed, for example, by axially rotating the fixed laser beam 28. The plurality of welded portions 56 can be formed by shifting the ferrule 35 with a prescribed pitch in the axial direction X. Otherwise, with the ferrule 35 being fixed, the laser beam 28 may be shifted. Otherwise, with the laser beam 28 being fixed, the laser 28 may be rotated around the ferrule 35.

In this way, in any case, because the laser beam 28 being in focus, i.e., power density is constant, the welded portions 55, 56 are formed, even if the surface to be processed is curved, the optical fiber 31 and ferrule 35 can be surely laser-welded to each other.

Using the Q switch pulse at the frequency of 2–10 kHz, the laser beam 28 is applied from the side of the ferrule 35 to melt the inner sheath 33 of the optical fiber 31 so that the inner sheath 33 and the ferrule 35 are fixed to each other. The laser beam 28 can be applied in any condition, but in this embodiment, the laser welding has been carried out with the laser output of 17–22 A and at the speed (rotating speed in the case of FIG. 3B) of scanning the laser beam 28 of 0.002–0.03 m/s.

The frequency, laser output and scanning speed of the laser beam in the Q switch pulse mode can vary according to the material, shape and size of the ferrule 35, material of the optical fiber 31 and the thickness of the inner sheath 33. However, the application condition of the Q switch pulse has been set so that the optical fiber 31 and the ferrule 35 can be fixed without imposing thermal shock to the fiber wire 32.

The use of the Q switch pulse provides a peak output with a high output and narrow time width by oscillating a short pulse at a high repetitive speed. This can narrow the thermally influenced layer in the vicinity of the welded portion, and hence can prevent the fiber wire 32 from being damaged. The Q switch pulse can preferably excite the pulse which provides a shallower melting depth and less thermal influence on the environment.

As shown, the plurality of welded portions 55, 56 are formed in order to increase the welding area and improve the fixing force between the optical fiber 31 and the ferrule 35. Although the interval between the adjacent welded portions is not limited, narrowing the interval improves the fixing force.

Because the respective welded portions 55, 56 are formed with the laser beam 28 being in focus, i.e., the laser beam 28 is applied with the power density being constant, even if the outer surface of the optical fiber 31 is curved, the optical fiber 31 and ferrule 35 can be surely secured to each other.

The use of the YAG laser serving as the solid laser for the laser beam 28 makes the welding by the laser beam with a short wavelength, thereby performing the accurate processing for a short time without giving thermal influence on the fiber wire 31.

In this way, in accordance with this embodiment, because the optical fiber 31 and ferrule 35 are fixed using the laser beam 28, the fixing time can be shortened to improve the productivity as compared with the case of fixing using adhesive. Further, because the laser beam 28 is applied while either the ferrule 35 or the laser beam 28 is being shifted, the welded portions 55 and 56 each having a line or arc shape are formed with the power density being constant, and the welded areas can be increased, thereby improving the fixing force between the optical fiber 31 and the ferrule 35.

This invention should not be limited to this embodiment, but the laser welding can be realized in the following manner. The laser beam 28 is applied while either the ferrule 35 or the laser beam 28 is being shifted in the direction Y perpendicular to the axial direction. Then, after the ferrule 35 is turned over by 180°, the laser beam 28 is applied again while either the ferrule 35 or the laser beam 28 is being shifted in the direction perpendicular to the axial direction. If the sufficient fixing strength can be obtained on the one side of the ferrule 35, it is not necessary to turn over the ferrule 35 by 180°. In accordance with this technique, because the welded portions each being in a line shape can be easily formed in the direction Y perpendicular to the axial direction, the configuration for the processing system does not become complicate, thereby improving the workability of fixing between the optical fiber 31 and the ferrule 35.

Incidentally, the contents of Japanese Patent Appln. No. 02-209513 filed on Jul. 18, 2002 are hereby incorporated by reference.

What is claimed is:

1. An optical fiber fixing method for fixing an optical fiber having a coating into a cylindrical ferrule, comprising the step of:

applying a laser beam while either said ferrule or said laser beam is being shifted so as to form a plurality of welded portions at the boundary between the coating of said optical fiber and said ferrule, said laser beam being oscillated in a Q switch mode at a repetitive frequency of 2–10 kHz.

2. The optical fiber fixing method according to claim 1, wherein either said ferrule or said laser beam is shifted in a direction perpendicular to an axial direction of the ferrule.

3. The optical fiber fixing method according to claim 1, wherein while either said ferrule or laser beam is being rotated about a longitudinal axis of the ferrule.

4. The optical fiber fixing method according to claim 1, wherein said laser beam is provided by a YAG laser.

5. The optical fiber fixing method according to claim 4, wherein said YAG laser is oscillated in a pulse-exciting system.

6. The optical fiber fixing method according claim 1, wherein said ferrule is made of transparent or semitransparent synthetic resin, and said coating of the optical fiber is made of opaque synthetic resin.

7. The optical fiber fixing method according to claim 1, wherein either said ferrule or said laser beam is shifted in an axial direction of the ferrule.

8. The optical fiber fixing method according to claim 1, wherein said laser beam is applied under the conditions of a laser output of 17–22 A and a scanning speed of 0.002–0.03 m/s.

* * * * *